US007820139B2

(12) United States Patent
Morin et al.

(10) Patent No.: US 7,820,139 B2
(45) Date of Patent: Oct. 26, 2010

(54) METHOD FOR ENERGY CONVERSION MINIMIZING OXYGEN CONSUMPTION

(75) Inventors: Jean-Xavier Morin, Neuville aux Bois (FR); Corinne Beal, Voisins le Bretonneux (FR)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 11/628,928

(22) PCT Filed: Jun. 9, 2005

(86) PCT No.: PCT/EP2005/052680

§ 371 (c)(1),
(2), (4) Date: Dec. 7, 2006

(87) PCT Pub. No.: WO2005/124232

PCT Pub. Date: Dec. 29, 2005

(65) Prior Publication Data

US 2008/0260629 A1    Oct. 23, 2008

(30) Foreign Application Priority Data

Jun. 11, 2004    (FR) .................................. 04 51263

(51) Int. Cl.
*C01B 3/26*    (2006.01)
*C01B 3/24*    (2006.01)
(52) U.S. Cl. ...................... 423/651; 423/650
(58) Field of Classification Search ................. 110/342; 423/651
See application file for complete search history.

(56) References Cited

U.S. PATENT DOCUMENTS

| 3,969,089 | A | | 7/1976 | Moss et al. |
|---|---|---|---|---|
| 4,469,050 | A | | 9/1984 | Korenberg et al. |
| 4,616,576 | A | | 10/1986 | Engstroem et al. |
| 4,683,840 | A | | 8/1987 | Morin et al. |
| 4,854,249 | A | | 8/1989 | Khinkis et al. |
| 4,929,255 | A | * | 5/1990 | Hakulin et al. ............ 48/197 R |
| 5,306,481 | A | * | 4/1994 | Mansour et al. ............. 423/652 |
| 5,715,764 | A | * | 2/1998 | Lyngfelt et al. ............. 110/245 |
| 5,987,874 | A | | 11/1999 | Collin et al. |
| 6,431,095 | B2 | * | 8/2002 | Malaubier et al. ........... 110/342 |
| 6,494,153 | B1 | * | 12/2002 | Lyon .......................... 110/345 |

FOREIGN PATENT DOCUMENTS

| DE | 43 08 103 | 9/1994 |
|---|---|---|
| EP | 0 406 185 A2 | 2/1991 |
| EP | 0 406 185 A3 | 2/1991 |
| GB | 1084977 | 9/1967 |

OTHER PUBLICATIONS

PCT International Search Report (PCT/EP2005/052680).

* cited by examiner

*Primary Examiner*—Melvin C Mayes
*Assistant Examiner*—Kenneth Vaden
(74) *Attorney, Agent, or Firm*—Robert D. Crawford

(57) ABSTRACT

The invention concerns a method for energy conversion of solid fuels in particular containing carbon comprising a first step which consists in reacting said fuels in a first energy conversion reactor (2, 20). The invention is characterized in that it comprises a second step which consists in injecting oxygen brought to the output of said reactor (2, 20), the reaction of the first step being carried out in at least a circulating fluidized bed (30, 31, 40) and in that the metal oxides circulate between two interconnected circulating fluidized beds (30, 31, 40) converting the fuel and oxidizing the oxides.

15 Claims, 3 Drawing Sheets

METHOD FOR ENERGY CONVERSION MINIMIZING OXYGEN CONSUMPTION

BACKGROUND OF THE INVENTION

The present invention relates to a method of energy conversion of solid fuels containing carbon.

The emission of greenhouse gases, in particular $CO_2$, in power stations using fossil fuels must increasingly be brought under control. Controlling such emission entails solving new problems such as capturing the $CO_2$ in the flue gases of power stations using fossil fuels or in the gases from installations using biomass type renewable energy sources (non-fossil carbon) for the production of substitute fuels usable in transportation, and all of the above combined while minimizing the cost and minimizing the modification of existing installations.

Finally, the progressive depletion of oil fields is generating a dynamic for the large scale deployment of recovery techniques assisted by injecting $CO_2$ that are capable of doubling the extraction capacities of accessible reserves.

To this end, it is known in the art to use oxygen and steam to convert solid fuels containing carbonaceous materials by autothermic gasification to produce a syngas containing CO and $H_2$ that may be used in gas turbines, hydrogen production units or units for synthesizing methanol type compounds.

The above type of installation is described in our patents FR 2 660 415 and FR 2 559 776. However, the presence of unconverted tar or fine unburned carbon particle type hydrocarbons in these installations creates unwanted condensation and unwanted components in the cooling and syngas processing systems and degrades the yield from such installations.

To eliminate the tar and unburned carbon, the syngas is subject to a thermal reforming process by increasing the temperature resulting from partial combustion, which necessitates an additional supply of secondary oxygen.

As described in our U.S. Pat. No. 6,505,567, it is also possible to convert these solid fuels energetically by employing combustion processes using oxygen and recycled $CO_2$, rather than external air, which produces combustion flue gases containing principally $CO_2$ and steam, with no nitrogen, in order to be able to use these flue gases for operations of assisted recovery of subterranean petroleum or to enable their subterranean storage. However, these processes consume a great deal of oxygen, which must be produced by a dedicated air distillation unit using some of the energy produced, and therefore adding to the electrical energy consumption burden.

Also known in the art is using thermochemical cycles in combustion processes for converting solid fuels containing carbonaceous materials to produce combustion flue gases containing principally $CO_2$ and water. With this solution, it is not necessary to use a dedicated air distillation unit, but a problem arises from the presence in the combustion flue gases of unconverted carbonaceous compounds, such as hydrocarbons ($C_nH_n$) or unburned carbon, which are unacceptable for assisted petroleum recovery processes or subterranean storage and must be eliminated.

The object of the present invention is to propose an energy conversion method that minimizes the consumption of oxygen and minimizes the production of unconverted carbonaceous compounds.

SUMMARY OF THE INVENTION

The method of the invention is a method of energy conversion of solid fuels containing in particular carbon, comprising a first step of reacting said fuels in a first energy conversion reactor, characterized in that it comprises a second step of injecting oxygen at the exit from said reactor, the reaction of the first step being effected in at least one circulating fluidized bed and in that, to convert the fuel and oxidize the oxide, metal oxides circulate between two interconnected circulating fluidized beds.

This second step converts practically all of the residual hydrocarbons contained in the gases from the first step into $CO_2$, CO, $H_2$ and steam in the case of a gasification first step and into $CO_2$ and steam in the case of a combustion first step.

According to one feature, the reaction of the first step is carried out in at least one circulating fluidized bed. If there are two circulating fluidized beds they are interconnected. A circulating bed facilitates the transfer of mass and energy and thus the conversion of the fuels with the reactants.

According to another feature, metal oxides circulate between two interconnected circulating beds for conversion of the fuel and oxidation of the oxides. The metal oxides provide the additional oxygen necessary for the conversion of the carbon and the hydrogen contained in the fuel introduced into the conversion reactor.

In a first variant of the method, the energy conversion of the fuel is effected by combustion. If the quantity of oxygen entering the conversion reactor is greater than the reactional stoichiometric quantity, the conversion reaction is virtually total combustion, with the exception of unconverted carbonaceous compounds.

In one particular arrangement of the first variant, the injection of oxygen in the second step of the process is effected in the gas-solid separation cyclone of the fluidized bed. This cyclone is the site of intense turbulence in which flue gases and circulating solids are separated during a particular time spent in said cyclone. It is therefore advantageous to introduce therein oxygen from the second conversion step that combines with the unconverted carbonaceous compounds present in the combustion flue gases, such as hydrocarbons ($C_nH_m$) or unburned carbon.

In a first arrangement of the first variant, the oxygen is injected in the upper portion of the inlet duct of the cyclone. This has the advantage of injecting this oxygen into the gaseous phase of the flow containing the compounds to be converted, as it is known that the solids travel in the lower portion of this duct, and thereby procures additional processing time for the conversion reaction that takes place in the duct.

In a second arrangement of the first variant, the oxygen is injected into the ceiling of the cyclone. This offers the advantage that it develops a jet virtually coaxial with the axis of the cyclone without risk of impact on the walls.

In a third arrangement of the first variant the oxygen is injected at the exit of the cyclone. This allows injection into a gaseous phase that has a very low solids content and whose residual rotation after centrifuging is very suitable for a gaseous mixture with oxygen.

In a second variant, the energy conversion of the fuel is effected by gasification. If the quantity of oxygen in the conversion reactor is small, i.e. if it is low compared to the reactional stoichiometric quantity, then the reaction is one of partial gasification.

According to one particular feature of the second variant, primary gasification is carried out during thermochemical cycling. The thermochemical cycling is effected by exchanging metal oxides between two interconnected circulating fluidized beds. This cycle enables the subsequent production of purified hydrogen.

In a first arrangement of the second variant, the oxygen is injected in the second step through the ceiling into the downward vertical gas flow cyclone reactor.

According to a second arrangement of the second variant, the oxygen is injected substantially at the center of the downward vertical gas flow cyclone reactor. This injection develops a jet that is virtually coaxial with the axis of the cyclone without risk of impacts on the walls, and injection occurs where the residual rotation of the gas to be converted resulting from the first (centrifuging) step is very suitable for a gaseous mixture with oxygen.

According to another variant of the invention, the energy conversion method in accordance with the invention for solid fuels containing carbon in particular comprises a first step of reacting said fuels in an energy conversion reactor and is characterized in that it comprises two parallel channels for the reaction of said fuels in two energy conversion reactors, with a second step of injecting oxygen at the exit of said reactors, and in that an oxide oxidation reactor simultaneously feeds metal oxide particles in a controlled manner into the reactor and the primary gasifier.

BRIEF DESCRIPTION OF THE DRAWINGS

The invention will be better understood after reading the following description, which is given by way of example only and with reference to the appended drawings, in which.

DETAILED DESCRIPTION OF THE PREFERRED EMBODIMENT

For simplicity, the same reference numbers are used for the same items in the various figures.

Figure 1:
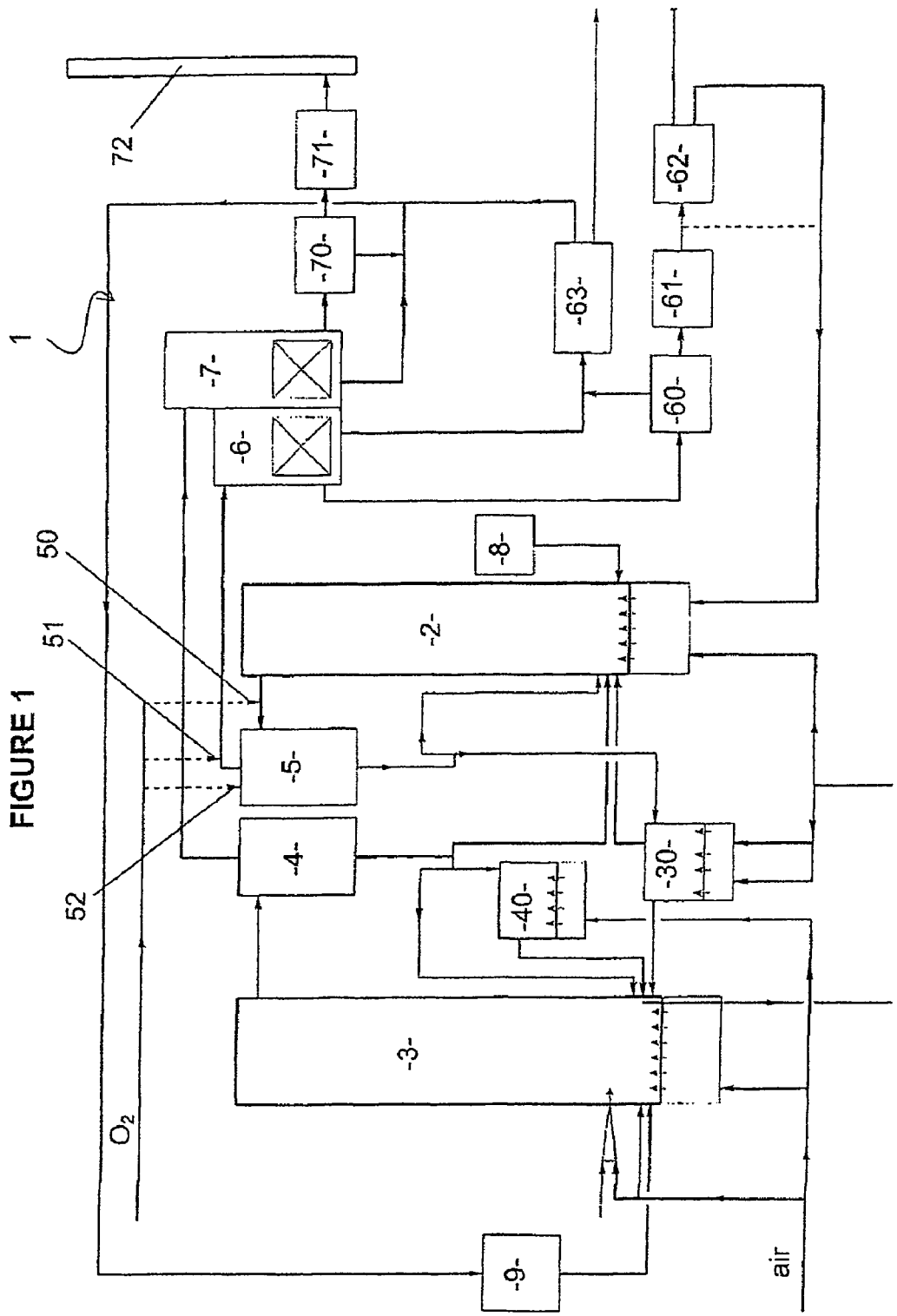
FIG. 1 is a general view of a total conversion or combustion system of the invention.

The combustion installation 1 represented in FIG. 1 comprises an oxide reduction reactor 2, an oxide oxidation reactor 3, two cyclones 4 and 5, each dedicated to one reactor, two rear cages 6 and 7 containing recovery exchangers for flue gases based on $CO_2$ and for air, each dedicated to one of the reactors. A bag filter 70, an induced draught fan 71 and a stack 72 are disposed after the rear pass 7. An ash and oxide separator 63 is placed after the rear pass 6 to process the solids with a bag filter 60, an induced draught fan 61 and a cooling and condensation circuit 62 for pretreating the $CO_2$. The reactors 2 and 3 are interconnected to exchange oxide particles.

The reduction reactor 2 is supplied with fuel from a silo 8 via the bed 30. The reactor 3 is supplied from a silo 9 via two circulating fluidized beds 40 and 30.

The reactor 2 is fluidized by a mixture made up of steam and recycled $CO_2$.

After reduction in the reactor 2, the oxides enter the cyclone 5, where solid oxide particles are separated from ash and combustion gases consisting of $CO_2$, $SO_2$ and steam. The oxygen of the second process step is introduced upstream of, in and/or downstream of the cyclone 5 via respective pipes 50, 51 and 52. These three separate injections of oxygen may be effected alone or in combination to ensure total conversion of unconverted compounds contained in the flue gases based on $CO_2$ from the reactor 2.

Figure 2:
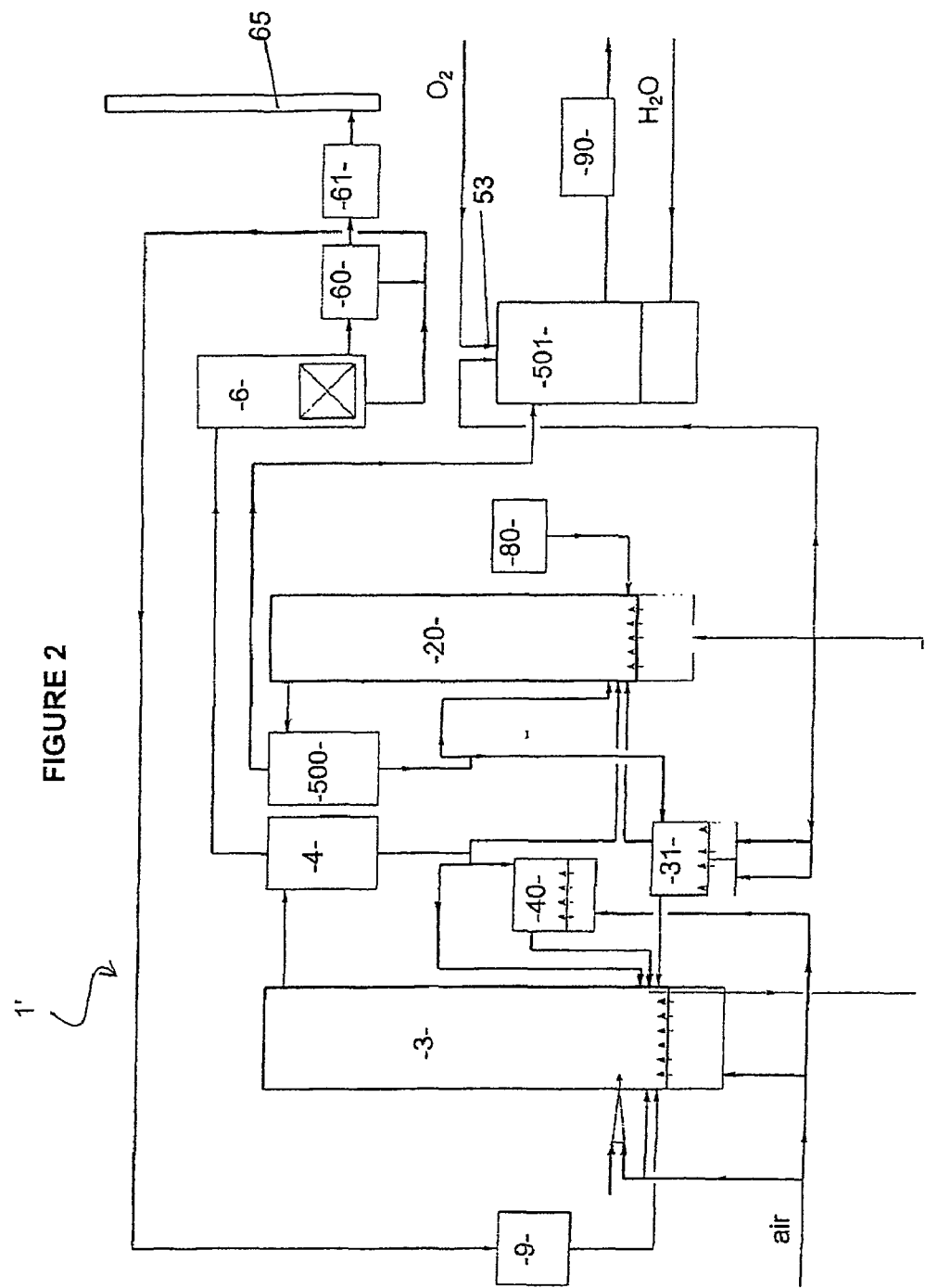
FIG. 2 is a general view of a partial conversion or gasification system of the invention.

In the partial gasification installation 1' represented in FIG. 2, there is for the first step of the process a primary gasifier 20 or cyclone reactor and an oxide oxidation reactor 3, two cyclones 4 and 500, the first cyclone 4 being connected to the reactor 3 and the second cyclone 500 being connected to the gasifier 20, a rear cage 6 in series with the cyclone 4 of the reactor 3 containing syngas and air recovery exchangers. A bag filter 60, an induced draught fan 61 and a stack 65 are placed after the rear pass 6. The raw syngas extracted from the cyclone 500 is directed to a secondary gasifier 501 into which the oxygen of the second step of the process is injected, thereby eliminating tars and unburned carbon by thermal reforming of the syngas at 90, i.e. by increasing the temperature resulting from partial combustion.

The primary gasifier 20 is fed with biomass from a silo 80 via the bed 31, for example.

The oxide used in the reactor 3 is a metal oxide, for example. The oxygen of the second step of the process is injected into the secondary gasifier 501 by a pipe 503 to eliminate tars and unburned carbon by thermal reforming of this syngas.

Figure 3:
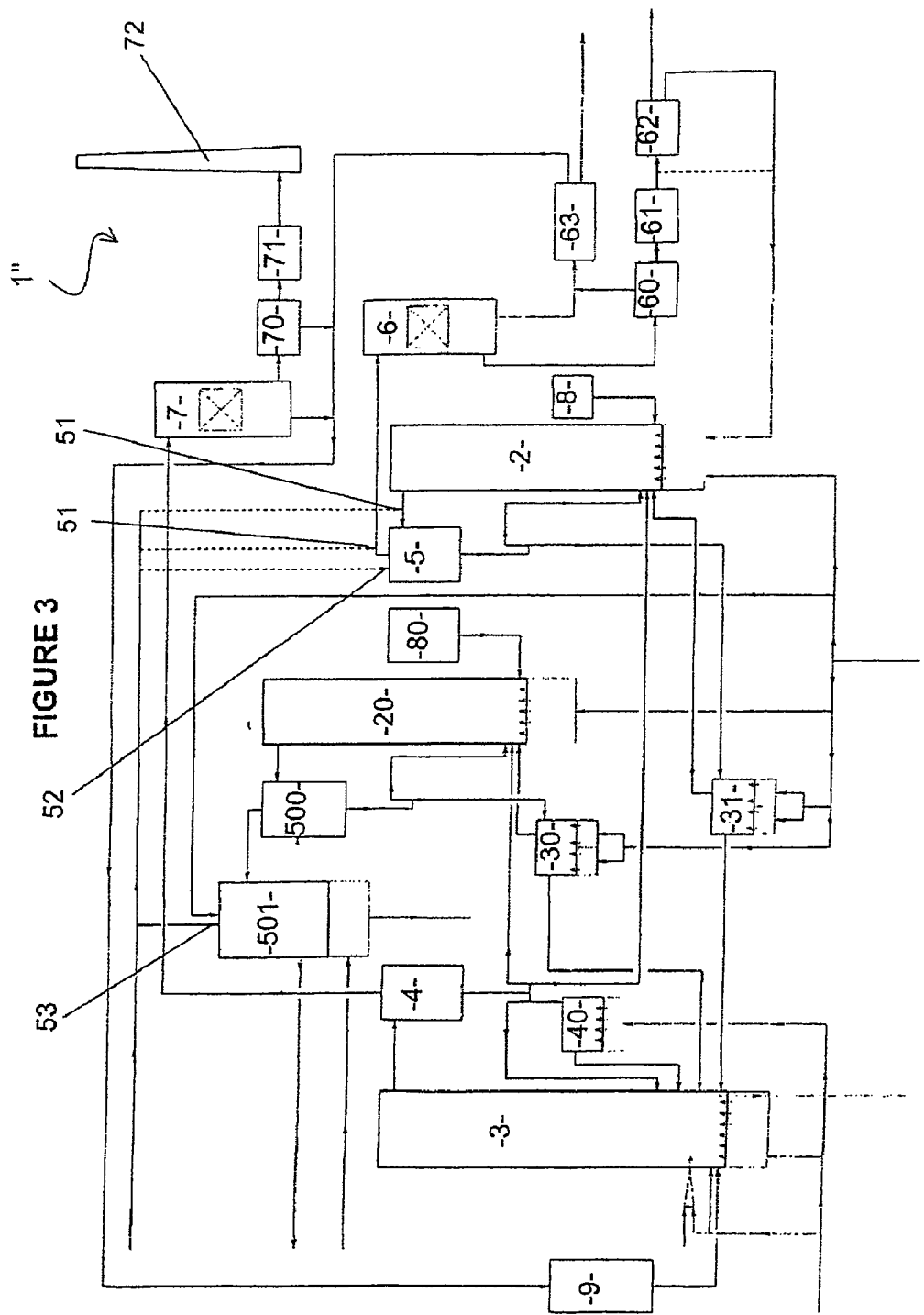
FIG. 3 is a general view of a system for the coproduction of electricity and hydrogen.

The system 1" represented in FIG. 3 comprises an oxide reduction reactor 2, an oxide oxidation reactor 3, a primary gasifier 20, and three cyclones 4, 5 and 500 respectively connected to the reactors 3 and 2 and to the primary gasifier 20. The cyclone 500 is connected to a secondary gasifier 501.

The reactor 2 is fed from a silo 8 via a fluidized bed 30, the reactor 3 is fed from a silo 9 via the circulating fluidized beds 40, 30 and 31, and the gasifier 20 is fed from the silo 80 via bed 31.

The oxygen of the second step of the process reaches the cyclone 5 via the pipes 50, 51 or 52 respectively placed at the inlet of the cyclone 5, in the cyclone 5 or at the outlet of the cyclone 5. Oxygen also reaches the secondary gasifier 501 via a pipe 53. In this configuration for coproduction of hydrogen (at 90) and electricity, the oxide oxidation reactor 3 feeds the combustion reactor 2 with metal oxide particles in excess relative to the stoichiometric quantity of oxygen and the primary gasifier 20 with metal oxide particles in deficit relative to the stoichiometric quantity of oxygen, simultaneously and in a controlled manner. The locations of the injection of oxygen for the second step of the process are similar to those in FIGS. 1 and 2.

The invention claimed is:

1. A method for effecting the energy conversion of solid fuels containing carbon comprising:
   reacting the solid fuels with oxygen provided by oxide particles to create flue gases and unconverted compounds in a first oxide reduction reactor having an exit, wherein the first oxide reduction reactor includes a first circulating fluidized bed;
   providing the flue gases, oxide particles and unconverted compounds from the exit of the first oxide reduction reactor directly to an inlet duct of a gas-solid separation cyclone, the separation cyclone also having a roof, and an exit, wherein the separation cyclone rotates the flue gases, oxide particles and unconverted compounds to create increase residence time within the cyclone and to separate out the oxide particles and convey the separated oxide particles to an oxide oxidation reactor;
   injecting oxygen into the separation cyclone of the first oxide reduction reactor to convert unconverted compounds exiting the first oxide reduction reactor;
   oxidizing the oxide particles in the oxide oxidation reactor, wherein the oxide oxidation reactor includes a second circulating fluidized bed; and
   circulating the oxide particles between the oxide oxidation reactor and the first oxide reduction reactor for conversion of the fuel and oxidization of the oxide particles.

2. The method of claim 1 wherein the energy conversion of the solid fuels is effected through combustion.

3. The method of claim 1 wherein the oxygen is injected into the inlet duct of the gas-solid separation cyclone that is operatively associated with the first oxide reduction reactor.

4. The method of claim 1 wherein the oxygen is injected through the roof of the gas-solid separation cyclone that is operatively associated with the first oxide reduction reactor.

5. The method of claim 1 wherein the oxygen is injected into the exit of the gas-solid separation cyclone that is operatively associated with the first oxide reduction reactor.

6. The method of claim 1 wherein the energy conversion of the solid fuels is effected through gasification.

7. The method of claim 6 wherein the energy conversion of the solid fuels is effected through gasification in a thermochemical cycle.

8. The method of claim 6 wherein the oxygen is injected through the roof of the gas-solid separation cyclone that is operatively associated with the first oxide reduction reactor.

9. The method of claim 8 wherein the oxygen is injected through the roof substantially at the center of the gas-solid separation cyclone that is operatively associated with the first oxide reduction reactor.

10. The method of claim 1, wherein the oxide particles are metal oxides.

11. The method of claim 1, further including a sixth step of providing a second oxide reduction reactor having a circulating fluidized bed to provide two channels for reaction of the fuel whereby oxide particles from the oxide oxidation reactor circulates to both the first and second reduction reactors, and a seventh step of injecting oxygen in the exit of the second oxide reduction reactor.

12. A method for effecting the energy conversion of solid fuels containing carbon comprising:

reacting the solid fuels with oxygen provided by oxide particles to create flue gas and unconverted compounds in a first oxide reduction reactor having an exit, wherein the first oxide reduction reactor includes a first circulating fluidized bed;

providing a gas-solid separation cyclone at the exit of the first oxide reduction reactor such that it receives the flue gas, unconverted compounds and oxide particles and separates out the oxide particles and provides increased residence time for reaction of the unconverted compounds;

injecting oxygen into the first gas-solid separation cyclone to cause increased conversion of unconverted compounds in the separation cyclone;

oxidizing the oxide particles in an oxide oxidation reactor to create flue gas and unconverted compounds, wherein the oxide oxidation reactor includes a second circulating fluidized bed; a circulating oxide particles between the oxide oxidation reactor and the first oxide reduction reactor for conversion of the fuel and oxidization of the oxide particles.

13. The method for effecting the energy conversion of claim 12 further comprising the step of:

injecting oxygen into an upper portion of the cyclone to procure additional processing time for the compounds to be converted as they spiral toward a bottom portion.

14. The method for effecting the energy conversion of claim 12 wherein the cyclone has a centerline and a roof, further comprising the step of:

injecting oxygen into the center of the roof substantially along the centerline to develop a jet virtually coaxial with the risk of impacting the walls, thereby causing increased conversion of the unconverted compounds.

15. A method for effecting the energy conversion of solid fuels containing carbon comprising:

reacting the solid fuels with oxygen provided by oxide particles to create flue gas and unconverted compounds in a first oxide reduction reactor having an exit, wherein the first oxide reduction reactor includes a first circulating fluidized bed;

providing a gas-solid separation cyclone having an inlet coupled to the exit of the first oxide reduction reactor such that it receives the flue gas, unconverted compounds and oxide particles, and an exit, the separation cyclone separates out the solid particles and exhausts a gaseous phase out of its outlet with very low solid content and with residual rotation;

injecting oxygen into the outlet of the gas-solid separation cyclone to cause increased mixing with the gaseous phase exhausted out of the exit thereby increasing conversion of unconverted compounds;

oxidizing the oxide particles in an oxide oxidation reactor to create flue gas and unconverted compounds, wherein the oxide oxidation reactor includes a second circulating fluidized bed; and circulating the oxide particles between the oxide oxidation reactor and the first oxide reduction reactor for conversion of the fuel and oxidization of the oxide particles.

* * * * *